(12) United States Patent
Platt (10) Patent No.: US 10,292,282 B1
(45) Date of Patent: May 14, 2019

(54) ADJUSTABLE HOLDER FOR AN ELECTRONIC DEVICE

(71) Applicant: Mark Platt, Lake Oswego, OR (US)

(72) Inventor: Mark Platt, Lake Oswego, OR (US)

( * ) Notice: Subject to any disclaimer, the term of this patent is extended or adjusted under 35 U.S.C. 154(b) by 0 days.

(21) Appl. No.: 14/513,118

(22) Filed: Oct. 13, 2014

Related U.S. Application Data (60) Provisional application No. 61/890,796, filed on Oct. 14, 2013.

(51) Int. Cl.
| | |
|---|---|
| *B60R 11/00* | (2006.01) |
| *H05K 5/02* | (2006.01) |
| *H05K 5/00* | (2006.01) |
| *B64D 11/00* | (2006.01) |
| *B60N 99/00* | (2006.01) |

(52) U.S. Cl.
CPC .......... *H05K 5/0204* (2013.01); *B60N 99/00* (2013.01); *B60R 11/00* (2013.01); *B64D 11/0015* (2013.01); *H05K 5/0086* (2013.01); *H05K 5/0239* (2013.01); *B60R 2011/0012* (2013.01)

(58) Field of Classification Search
CPC ...... A45F 5/00; A45F 3/02; A45F 2200/0516; A45F 2200/0525; A45F 2005/008; H05K 5/0204; H05K 5/0086; H05K 5/0239; B60R 11/00; B60R 2011/0012; B60N 99/00; B64D 11/0015
See application file for complete search history.

(56) References Cited

U.S. PATENT DOCUMENTS

| | | | | |
|---|---|---|---|---|
| 2,164,299 | A * | 6/1939 | Mandell ................... | A47G 1/08 |
| | | | | 122/1 R |
| 6,236,312 | B1 * | 5/2001 | Chitsazan et al. ........ | 340/539.32 |
| 6,318,692 | B1 * | 11/2001 | Cyrell ........................... | 248/317 |
| 8,668,122 | B2 * | 3/2014 | Case et al. .................... | 224/218 |
| 8,668,123 | B2 * | 3/2014 | Richmond ................... | 224/312 |
| 8,939,333 | B2 * | 1/2015 | Ivarez ........................... | 224/219 |
| 2003/0038149 | A1 * | 2/2003 | Purpura ........................ | 224/275 |
| 2010/0171021 | A1 * | 7/2010 | Smith ..................... | A45C 13/30 |
| | | | | 248/558 |
| 2011/0309117 | A1 * | 12/2011 | Roberts ........................ | 224/217 |
| 2012/0111881 | A1 * | 5/2012 | Gaddis et al. ................ | 220/752 |
| 2013/0270850 | A1 * | 10/2013 | Fan ............................ | A45F 5/00 |
| | | | | 294/137 |
| 2014/0282059 | A1 * | 9/2014 | Oh et al. ........................ | 715/744 |
| 2015/0076183 | A1 * | 3/2015 | Palma ...................... | A45F 5/004 |
| | | | | 224/162 |

* cited by examiner

*Primary Examiner* — Corey N Skurdal
(74) *Attorney, Agent, or Firm* — Owens Law Firm, PC (57) ABSTRACT

The present invention is directed to an apparatus for holding a portable or hand-held electronic device that is operated by an end user. In some embodiments, the apparatus comprises a body or housing that holds the electronic device. In some embodiments, the body or housing of the apparatus can be adjusted to accommodate or hold larger or smaller electronic devices. Further, in some embodiments, the apparatus is also configured for attachment to another structure, such as a car or airplane seat. In some embodiments, the apparatus is further configured to allow it to be reversibly pulled away from the other structure for use without completely detaching it from the other structure and then returning it to its original position attached to the other structure after use.

7 Claims, 11 Drawing Sheets

ADJUSTABLE HOLDER FOR AN ELECTRONIC DEVICE

BACKGROUND OF THE INVENTION

Field of the Invention

The invention relates generally to an apparatus for holding a portable or hand-held electronic device. In particular, the invention relates to an adjustable case for holding various sized portable or hand-held electronic devices, such as DVD players, computer tablets, or gaming devices, that is configured for attachment to another structure, such as the back of a car or airplane seat, while permitting use of the electronic device.

Description of Related Art

There are many cases used to cover or protect portable or hand-held electronic devices such as cell phones, tablet computers (such as iPads), and laptops. However, such cases are not adapted to be attached to another structure and to permit use of the electronic device while attached to such other structure. Therefore, a need exists for an apparatus that is configured to hold such devices but that can be adjusted to allow receipt and holding of different sized electronic devices. In addition, a need exists for such an apparatus to be configured to be attached to another structure, such as the back of a car seat or an airplane seat, and to permit use of the electronic device while attached. In addition a need exists for such an apparatus that is configured to be attached to another structure to remain portable and capable of being used when not attached to another structure.

BRIEF SUMMARY OF THE INVENTION

In general, the present invention is directed to an apparatus for holding a portable or hand-held electronic device that is operated by an end user, such as a cell phone or smart phone, a personal digital assistant, a table computer, an electronic reading device, a mini-tablet, a netbook, a personal computer, an electronic gaming device, a DVD player or other device for playing movies or other video or multimedia content, or any other electronic or digital device. In some embodiments, the apparatus comprises a body or housing that holds the electronic device. In some embodiments, the body or housing of the apparatus can be adjusted to accommodate or hold larger or smaller electronic devices. Further, in some embodiments, the apparatus is also configured for attachment to another structure, such as the back of a car or airplane seat or a chair, while still retaining the electronic device. In some embodiments, the apparatus is further configured to allow it to be reversibly pulled away from the other structure for use without completely detaching it from the other structure and then returning it to its original position attached to the other structure after use.

In particular, in one embodiment, the present invention comprises an apparatus for holding a portable, hand-held electronic device comprising a body having four sides each having a length and defining an opening for receipt of a portable, hand-held electronic device, the opening having a cross-sectional area and wherein the length of each of the four sides is adjustable to increase or decrease the cross-sectional area of the opening.

In another embodiment, the present invention comprises an apparatus for holding a portable, hand-held electronic device, comprising a case having four sides each having a length and defining an opening for receipt of a portable, hand-held electronic device, the opening having a cross-sectional area and wherein the length of each of the four sides is adjustable to increase or decrease the cross-sectional area of the opening; at least two straps attached to the case for attaching the case to another structure; and at least two retraction means disposed within the case for allowing each of the at least two straps to be pulled from the case and for retracting each of the at least two straps to a position within the case.

DETAILED DESCRIPTION OF THE INVENTION

The present invention is more fully described below with reference to the accompanying drawings. While the invention will be described in conjunction with particular embodiments, it should be understood that the invention can be applied to a wide variety of applications, and it is intended to cover alternatives, modifications, and equivalents within the spirit and scope of the invention. Accordingly, the following description is exemplary in that several embodiments are described (e.g., by use of the terms "preferably," "for example," or "in one embodiment"), but this description should not be viewed as limiting or as setting forth the only embodiments of the invention, as the invention encompasses other embodiments not specifically recited in this description. Further, the use of the terms "invention," "present invention," "embodiment," and similar terms throughout this description are used broadly and are not intended to mean that the invention requires, or is limited to, any particular aspect being described or that such description is the only manner in which the invention may be made or used.

In general, the present invention is directed to an apparatus for holding a portable or hand-held electronic device that is operated by an end user, such as a cell phone or smart phone, a personal digital assistant, a table computer, an electronic reading device, a mini-tablet, a netbook, a personal computer, an electronic gaming device, a DVD player or other device for playing movies or other video or multimedia content, or any other electronic or digital device. In some embodiments, the apparatus comprises a body or housing that holds the electronic device. In some embodiments, the body or housing of the apparatus can be adjusted to accommodate or hold larger or smaller electronic devices. Further, in some embodiments, the apparatus is also configured for attachment to another structure, such as the back of a car seat or a chair, while still retaining the electronic device. The apparatus is further configured to allow it to be reversibly pulled away from the other structure for use without completely detaching it from the other structure and then returning it to its original position attached to the other structure after use. Following, various embodiments of the apparatus are described in connection with the Figures.

Figure 1:
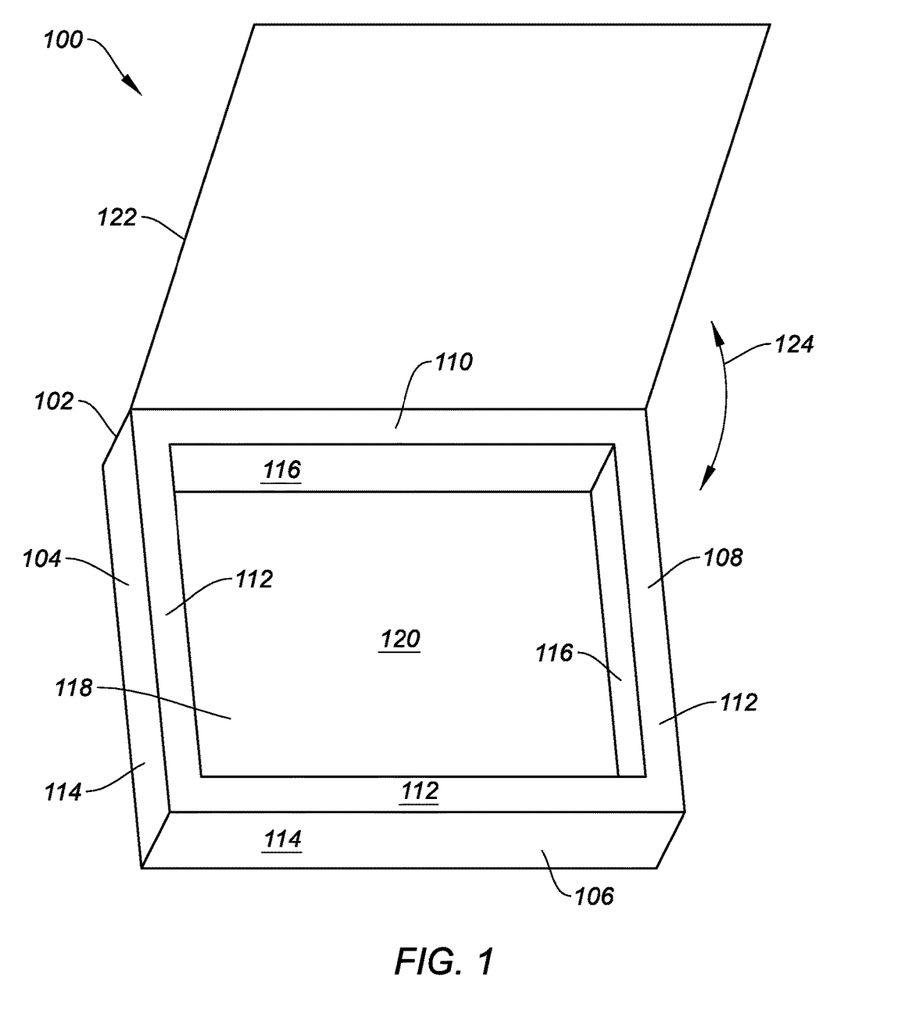
FIG. 1 is a perspective view of an apparatus for holding an electronic device according to one embodiment of the present invention.

FIG. 1 is a perspective view of an apparatus for holding an electronic device according to one embodiment of the present invention. The apparatus 100 for holding an electronic device includes a body 102 in the shape of a rectangle or square. The body 102 has four side portions 104, 106, 108, 110. As shown, each side portion has a top surface 112 and opposing side surfaces 114, 116, wherein one side surface 114 is on the exterior of the apparatus 100 and the opposing side surface 116 is on the interior of the apparatus 100. The four interior side surfaces 116 create a cavity 118 into which an electronic device can be placed and held by the apparatus 100. The manner in which the electronic device is secured when placed inside of the cavity 118 may be through a frictional fit of the electronic apparatus against the interior side surfaces 116. In some embodiments, the apparatus 100 may include a back panel 120 against which the back of the electronic device may rest; however, this back panel 120 is optional. In some embodiments, the apparatus 100 may also include an optional cover or lid 122 that can move in the direction of the arrow 124 shown in FIG. 1. Accordingly, the cover or lid 122 can be closed to cover the exposed surface of the electronic device held within the cavity 118 or opened to expose the surface of the electronic device when in use. A latch (not shown), such as a mechanical latch or magnetic latch can be used on the lid to secure it in a closed position.

It should be appreciated that the body of the apparatus may be made from any material. For example, the body may be plastic, plastic covered with a softer material or cloth, or a rubber or foam material that depresses.

Figure 2:
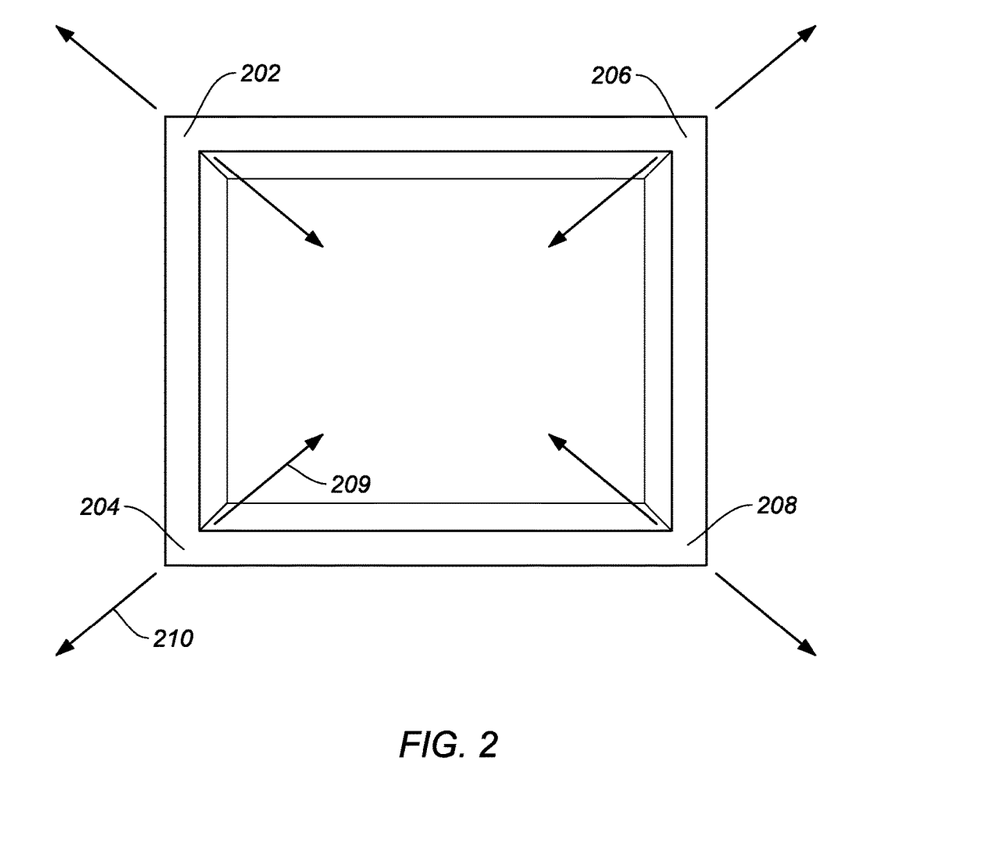
FIG. 2 is a perspective view of the sides of the apparatus of FIG. 1.

FIG. 2 is a perspective view of the sides of the apparatus of FIG. 1. In this embodiment, the length of each of the side portions 104, 106, 108, 110 can be adjusted to accommodate various sized electronic devices. For example, as shown in FIG. 2, each of the corners 202, 204, 206, 208 can be moved in the direction shown by the arrows 209 toward the center of the apparatus 100 or in the direction shown by the arrows 210 away from the center of the apparatus 100. In this manner the length of each side portion 104, 106, 108, 110 can be increased or decreased, thereby increasing or decreasing the cross-sectional or surface area of the cavity 118 to accommodate differently sized electronic devices having different surface areas. It should be appreciated that the magnitude to which the size of the cavity 118 is changed, including the change in its aspect ratio (i.e., ratio of length to width or vice versa) can be altered based upon the actual length of each side portion 104, 106, 108, 110 and the degree to which the length of the side portions 104, 106, 108, 110 can increased or decreased, as discussed further below. It should also be appreciated that the depth of the cavity 118 can be designed to be any depth based upon the depth or height of the side surfaces 114, 116.

Figure 3:
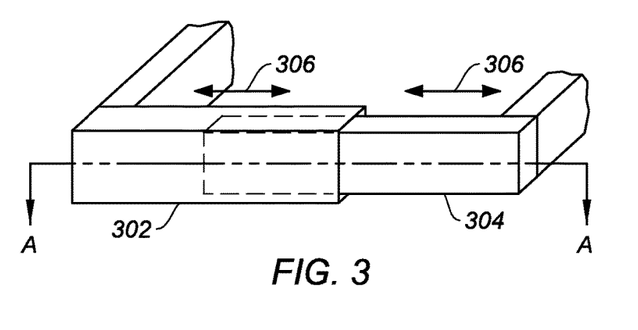
FIG. 3 illustrates a portion of one side portion of the apparatus of FIG. 1.

FIG. 3 illustrates a portion of one side portion of the apparatus of FIG. 1. Specifically, FIG. 3 illustrates one embodiment for the design of the apparatus of FIG. 1 and its side portions 104, 106, 108, 110 to permit the length of each side portion 104, 106, 108, 110 to be increased or decreased and to thereby increase or decrease the cross-sectional area or surface area of the cavity 118. In this embodiment, one side portion is illustrated but each side portion would be designed in the same manner. Specifically, each side portion 104, 106, 108, 110 includes two physically separate side pieces 302, 304. Each of these two side pieces 302, 304 have the same geometric shape. As shown each of these pieces is a rectangular cylinder, but other shapes may be used, such as a circular cylinder. One of these side pieces 302 has a larger cross-sectional area such that it fits around the outside perimeter of the other side piece 304. In this manner, the side piece 304 with the smaller cross-sectional area is capable of moving into and out of the other piece side 302 as shown by the arrows 306. It should be appreciated that the difference between the cross-sectional areas of the two side pieces 302, 304 will determine to some degree the ease with which the two pieces will move and, therefore, the ease with which the lengths of each of the overall sides 104, 106, 108, 110 can be adjusted. In one embodiment, this difference in cross-sectional areas is such that the two pieces fit snugly together such that the resulting frictional fit is sufficient to maintain a given overall length and avoid movement such that the electronic device is still held securely. It should be appreciated that if the body is made from a rubber or foam material (or an underlying hard material that is covered with a rubber or foam layer), the rubber or foam material can be made to be larger than necessary such that when the electronic device is placed within the cavity 118, a more secure friction fit can be obtained between the rubber or foam material and the electronic device.

It should be appreciated that the ability to adjust the length of the sides in this manner provides the ability to adjust the aspect ratio of the cavity 118. For example, if the lengths of two opposing sides are adjusted without adjusting the lengths of the other pair of opposing sides, the aspect ratio can be changed. Accordingly, the ability to adjust the lengths of each of the side portions 104, 106, 108, 110, and in particular, the ability to independently adjust the lengths of each opposing pair of side portions 104/108 and 106/110 (i.e., the lengths of opposing side portions 104 and 108 can be adjusted to a given length separately and apart from the lengths of opposing side portions 106 and 110) provides the ability to not only adjust the size of the cavity 118 for receipt of differently sized electronic devices but to also adjust the aspect ratio of the size of the cavity 118 to receive electronic devices having different aspect ratios.

Figure 4:
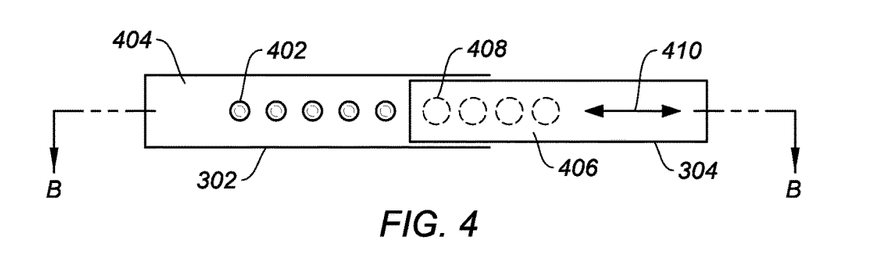
FIG. 4 illustrates a portion of the side portion of FIG. 3 taken along line A-A.

FIG. 4 illustrates a portion of the side portion of FIG. 3 taken along line A-A. From this perspective, one embodiment for securing the two side pieces 302, 304 in a given position, thereby securing the desired length for a side portion 104, 106, 108, 110, is illustrated. This view is basically a top view of the inside bottom of each of the two side pieces 302, 304. The side piece 302 having the larger cross-sectional area has small bumps 402 that protrude from the inside bottom surface 404 of the side piece 302. These bumps 402 can be spaced at intervals that provide sufficient control over desired changes in the overall length of the corresponding side portion 104, 106, 108, 110. The smaller side piece 304 that fits inside of the side piece 302 having a larger cross-sectional area has corresponding depressions or holes 408 on its bottom surface 406 (shown in relief as these bumps are located on the underside of bottom surface 406 of this side piece 304) that receive the bumps 402. In this manner, as the smaller side piece 304 is moved into or out of the side piece 302 in the direction of the arrow 410, once the desired overall length of the side portion is achieved, the mating of the bumps and the depressions or holes will secure the two side pieces 302, 304 in that given position.

Figure 5:
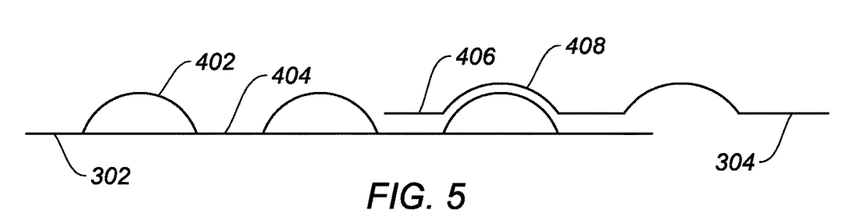
FIG. 5 illustrates a cross-sectional view of FIG. 4 taken along line B-B.

FIG. 5 illustrates a cross-sectional view of FIG. 4 taken along line B-B. Several of the bumps 402 located on the inside bottom surface 404 of the side piece 302 having the larger cross-sectional area and the corresponding depressions or holes 408 on the bottom surface 406 of the side piece having the smaller cross-sectional area are shown. The rightmost bump 402 is shown as being engaged with or mated to a corresponding depression or hole 408. Accordingly, it can be appreciated that as the side portion 304 with the smaller cross-sectional area is moved to the left in FIG. 5, additional bumps 402 will be engaged or mated to additional corresponding depressions or holes 408, with the overall length of this side portion being reduced or shortened. In the opposite manner, as the side portion 304 with the smaller cross-sectional area is moved to the right in FIG. 5, fewer bumps 402 will be engaged or mated to additional corresponding depressions or holes 408, with the overall length of this side portion being lengthened.

Figure 6:
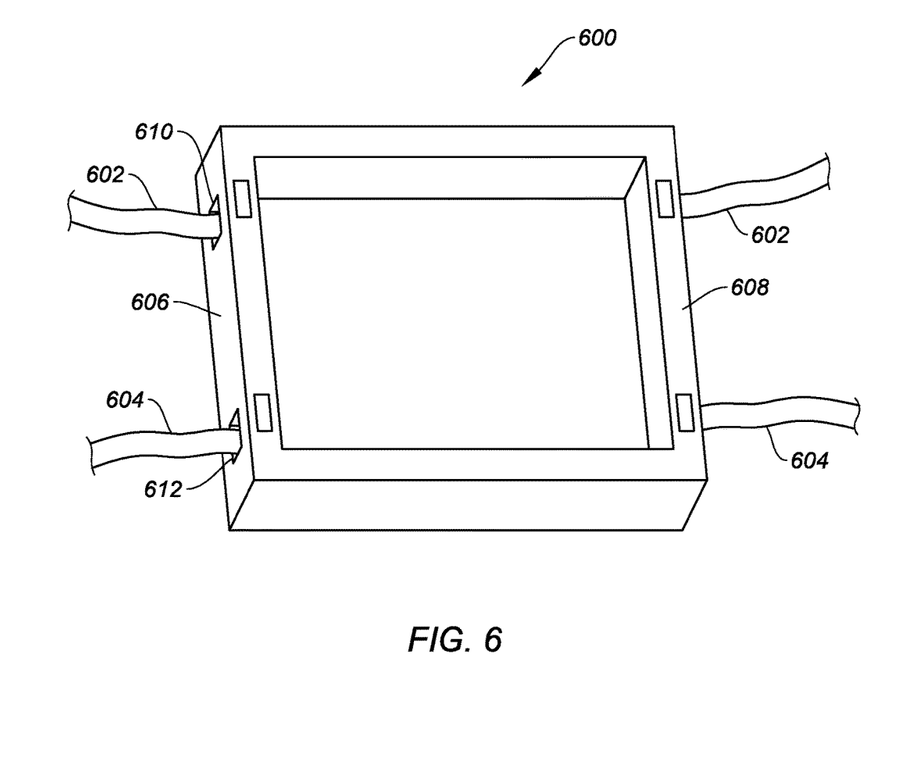
FIG. 6 illustrates a perspective view of an apparatus for holding an electronic device according to one embodiment of the present invention.

FIG. 6 illustrates a perspective view of an apparatus for holding an electronic device according to one embodiment of the present invention. The apparatus 600 is similar to that shown in FIG. 1. However, in this embodiment, the apparatus 600 includes two straps 602, 604 that are used to attach the apparatus to another structure. This structure can be any structure to which a user may desire to attach the apparatus and the electronic device being held by the apparatus. For example, the apparatus may be attached to a front car seat such that a user of the electronic device sitting behind the front seat can easily view or use the electronic device. Alternatively, the apparatus could be attached to a post or arm located on a desk to place the electronic device at a more comfortable viewing position to a person sitting at the desk.

Each of these straps 602, 604 extends from one side 606 of the apparatus 600 to an opposite side 608 such that they can be wrapped around another structure to thereby attach the apparatus 600 to that structure. It should be appreciated that the structure to which the apparatus 600 is attached would be positioned behind the apparatus 600 so as to not obstruct the view of the electronic device being held by the apparatus 600. The ends of each of the straps 602, 604 are attached to the sides 606, 608 at locations 610, 612 (only shown on one side in FIG. 6).

It should be appreciated that the straps 602, 604 may be made from any material, including elastic or flexible material that stretches or a non-elastic material that does not stretch. In either case, depending upon the structure to which the apparatus is attached, the straps 602, 604 may optionally include connectors to allow each of the straps 602, 604 to be disconnected at some point along their length. In some cases, this may allow the user to more easily place the straps 602, 604 around a given structure and then connect the straps back together. Alternatively, if the straps 602, 604 are elastic, depending on the size and geometry of the structure to which the apparatus will be attached, straps without a connectors, (i.e., a contiguous elastic strap) may simply be stretched and placed around the structure and then automatically retract to a position that secures the apparatus against the structure. It should be appreciated that in some embodiments, the length of the straps can be adjusted to provide a longer or shorter length so as to provide the ability to tighten the straps 602, 604 around a given structure.

Figure 7:
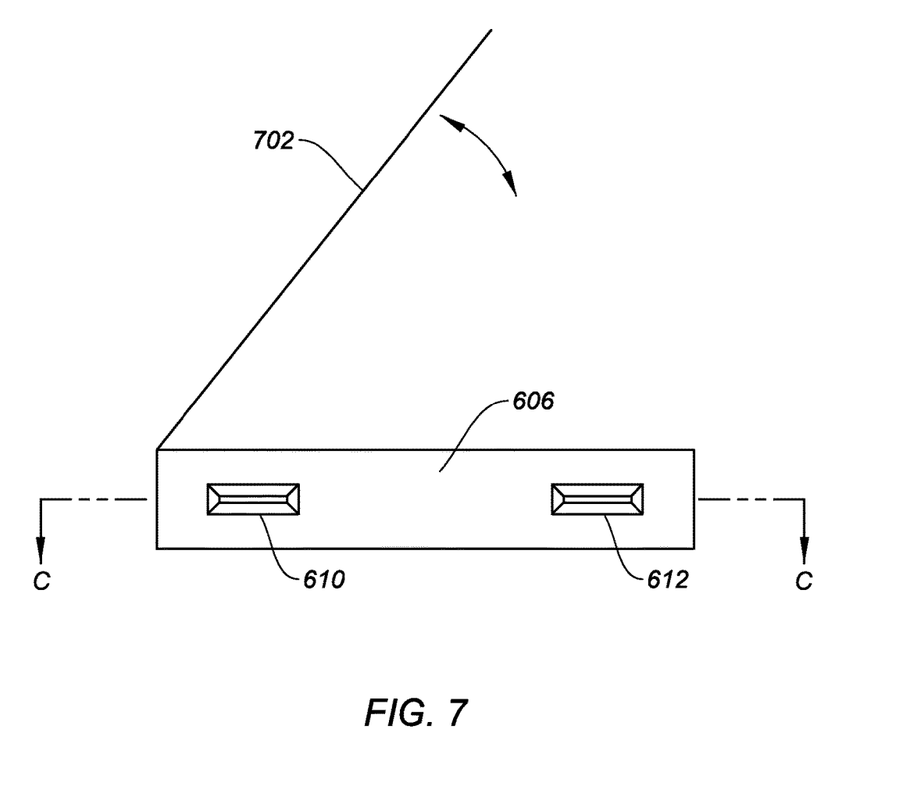
FIG. 7 illustrates a view of one side of the apparatus of FIG. 6.

FIG. 7 illustrates a view of one side of the apparatus of FIG. 6. As shown, the ends of each of the straps 602, 604 are attached to the side 606 of the apparatus 600 at two locations 610, 612. It should be appreciated that the opposite ends of the straps 602, 604 are attached to similar locations on the opposite side of the apparatus 600. These locations 610, 612 can be placed anywhere along the length of the side 606 of the apparatus 600. However, in some embodiments, these locations 608, 610 are placed a given distance apart to facilitate a more stable attachment to another structure. In other words, if the straps are wrapped around another structure, in some embodiments, having the straps 602, 604 as far apart as possible will provide a more stable attachment to the structure such that the apparatus 600 does not rotate or wobble as may occur if the straps are adjacent to each other. The straps 602, 604 can be attached at these locations in any manner known in the art. In some embodiments, these locations 610, 612 are recessed openings in the sides 606, 608 such that the ends of the straps 602, 604 are attached inside of the side portion of the apparatus. FIG. 7 also illustrates an optional lid 702 that may be closed to cover the exposed surface of the electronic device being held by the apparatus. It should be appreciated, however, in one embodiment, the lid 702 when used in connection with the straps 602, 604, is capable of being flipped or rotated in the opposite direction so that it resides between the back of the apparatus and the structure against which the apparatus is held. In one embodiment, the lid 702 includes seams or sets of parallel creases along which the lid may be folded so that it can be folded backwards over the back side of the apparatus. Alternatively, the lid 702 may be made of a flexible material that allows it to be bent in any direction.

Figure 8:
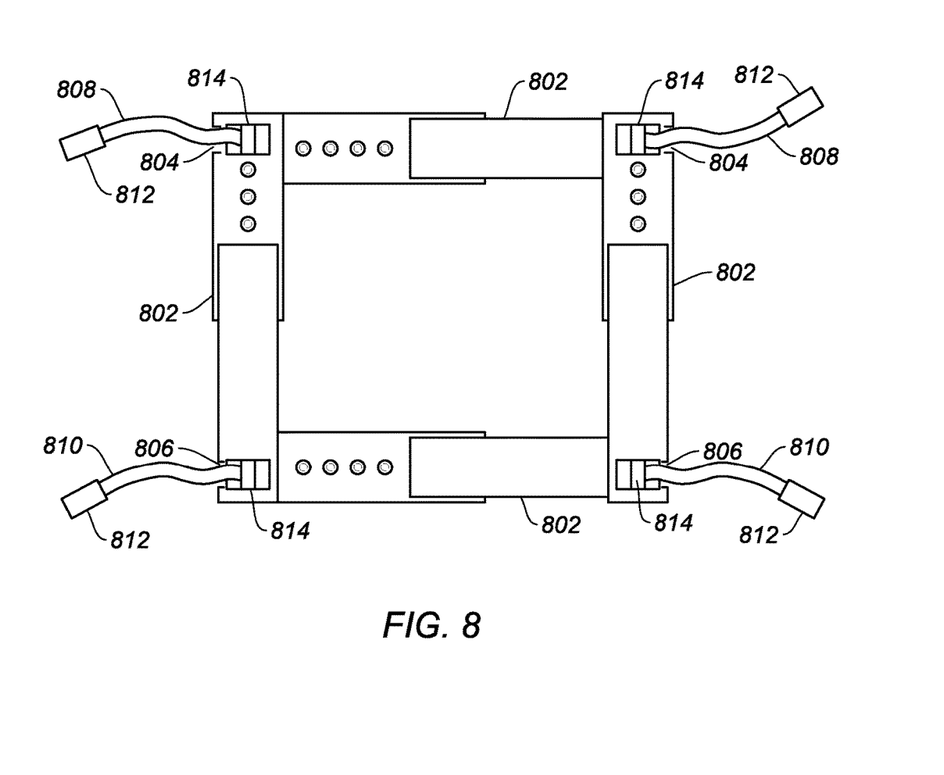
FIG. 8 is a cross-sectional view of FIG. 7 taken along line C-C.

FIG. 8 is a cross-sectional view of FIG. 7 taken along line C-C. As shown, the side portions 802 are similar to those shown in connection with FIGS. 3-5 in that each side portion includes two side pieces with one fitting within the other such that the two pieces reversibly slide apart and together. Disposed at opposite ends of two opposite side pieces are the locations 804, 806 for attachment of the straps 808, 810. The straps 808, 810 are attached to the side portions 802 at these locations. In this embodiment, each strap 808, 810 includes two portions each having one end connected to the side portion 802 at the locations 804, 806 and having a connector 812 at its other end. The connectors 812 include male and female connectors such that the two portions of each strap 808, 810 can be connected together. Accordingly, the straps 808, 810 can be placed around a structure and connected. In some embodiments the connectors 812 include connectors that are configured to gather any slack in the straps 808, 810 and thereby tighten the straps 808, 810 around the structure against which the apparatus will be held.

In one embodiment the straps 808, 810 are retractable. In this case, an apparatus for retracting and winding the straps can be disposed within the side portions 802 at the locations 804, 806 where the straps are otherwise connected to the side portions 802. It should be appreciated that devices for retracting straps are well known in the art, such as those used for car seat belts, retractable dog leashes, or retractable tape measures, and these devices can be placed at each of the four locations 804, 806 or at only two of the four locations 804, 806, one for each strap 808, 810. Accordingly, with four retraction devices, each of the two portions of each strap 808, 810 can be separately pulled out to its desired length and retracted to tighten the strap once connected to its corresponding other portion. With two retraction devices, one portion of each of the two straps 808, 810 can be pulled out to a necessary length and connected to its corresponding, non-retractable portion and then retracted to tighten the strap.

It should be appreciated that buttons or other means for releasing and locking the retractable straps may be used. As discussed below in connection with FIGS. 14-17, when the apparatus is attached to a structure, such as a car seat, the user may elect to release the straps thereby allowing the apparatus and the electronic device to be pulled away from the structure for use. In this case, the user may push a button on the apparatus corresponding to each strap to permit the strap to be extended. The user may then elect to lock the retractable straps in an extended position. The user may then elect to return the apparatus and the electronic device to a position where it is position against the structure by again pushing a button to release the lock on the retractable straps and allowing them to retract and shorten in length. Once the apparatus is returned to a position adjacent to the structure, the retractable straps would be locked in place again.

Figure 9:
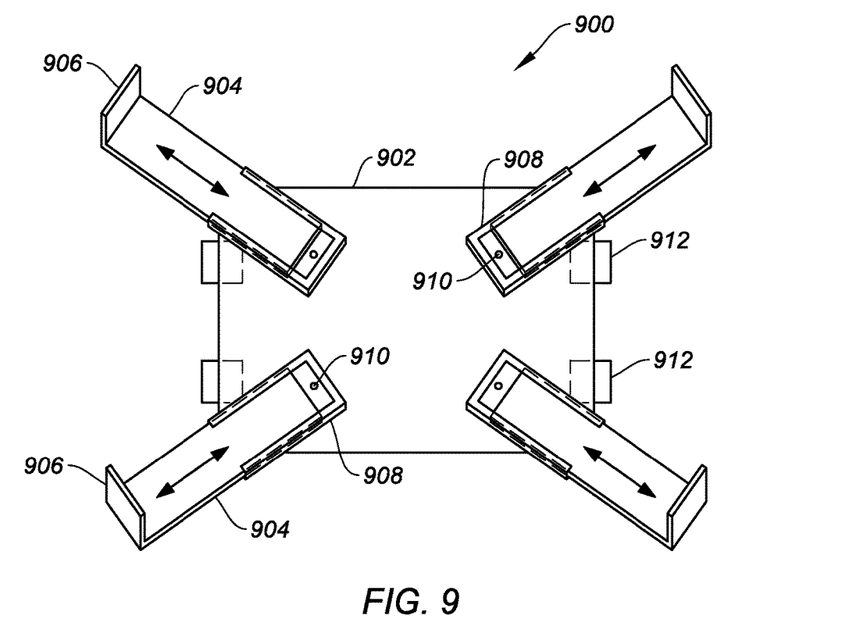
FIG. 9 is a top view of another apparatus for holding an electronic device according to one embodiment of the present invention.

FIG. 9 is a top view of another apparatus for holding an electronic device according to one embodiment of the present invention. The apparatus 900 for holding an electronic device includes a body 902, which can be any shape but is shown as a rectangle. Four adjustable corner portions 904 are disposed on top of the body 902. Each of these adjustable corner portions 904 includes a raised end portion 906 located at the outer end of the adjustable corner portion 904 that in use is used to hold the corners of a given electronic device. On top of the body are four tracks or slots 908 that are sized to receive the ends of the adjustable corner portions 904 opposite the ends at which the raised end portion 906 is located. As described in connection with FIGS. 4 and 5, a similar bump 910 and corresponding hole or depression system can be used to adjust the length to which each of the adjustable corner portions 904 is extend away from the body 902. Accordingly, each adjustable corner portion 904 can be extended independently and its length adjusted to accommodate any sized electronic device with any aspect ratio, noting that in this embodiment, the electronic device is being held in place at its corners. Housings 912 for straps (not shown), including retractable straps are disposed on the sides of the body 902.

It should be appreciated that the body 902 and the adjustable corner portions 904 can be made from any material, as described above and including a plastic or other hard material covered by a rubber or foam material. In one embodiment, the raised portions 906 are coated with a rubber material to provide an additional frictional fit when disposed against the corner of the electronic device. Further, it should be appreciated that other means for locking the position of the adjustable corner portions 904 may be used. For example, a lever-operated side portion that extends and retracts from within the track or slot 908 to push against the edge or side of the corresponding adjustable corner portion 904 may be used. Further, separate clamps may be attached to the body that clamp each corresponding adjustable corner portion 904 in place may be used.

Figure 10:
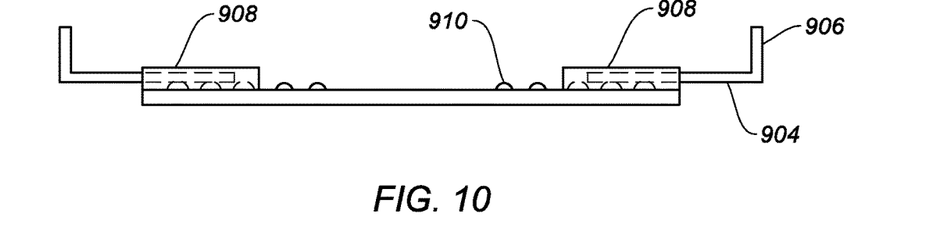
FIG. 10 is a front side view of the apparatus of FIG. 9.

FIG. 10 is a front side view of the apparatus of FIG. 9. This view illustrates the adjustable corner portions 904 including how each slides or fits into a corresponding track or slot 908.

Figure 11:
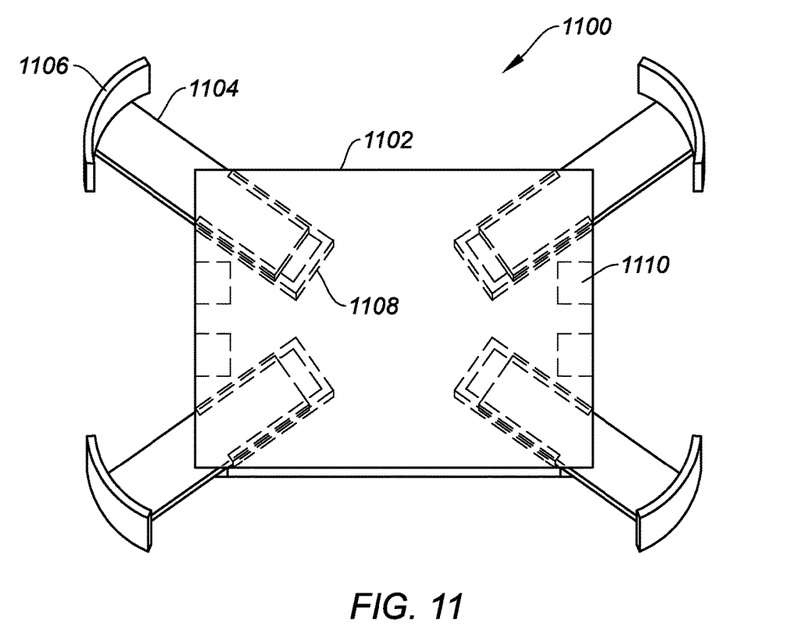
FIG. 11 is a top view of another apparatus for holding an electronic device according to one embodiment of the present invention.

FIG. 11 is a top view of another apparatus for holding an electronic device according to one embodiment of the present invention. The apparatus 1100 for holding an electronic device includes a body 1102, which can be any shape but is shown as a rectangle. Four adjustable corner portions 1104 are disposed within the body 1102. Each of these adjustable corner portions 1104 includes a raised end portion 1106 located at the outer end of the adjustable corner portion 1104 that in use is used to hold the corners of a given electronic device, similar to those shown in connection with FIGS. 9 and 10. However, in this embodiment, rather than have open tracks or slots on top of the body, the tracks or slots 1108 into which each of the ends of the adjustable corner portions 1104 is placed are within the body 1102.

Also, as described in connection with FIGS. 4 and 5, a similar bump and corresponding hole or depression system can be used to adjust the length to which each of the adjustable corner portions 1104 is extend away from the body 1102. Accordingly, each adjustable corner portion 1104 can be extended independently and its length adjusted to accommodate any sized electronic device with any aspect ratio, noting that in this embodiment, the electronic device is being held in place at its corners. Housings 1110 for straps (not shown), including retractable straps, can also be included within the body 1102.

Similarly, it should be appreciated that the body 1102 and the adjustable corner portions 1104 can be made from any material, as described above and including a plastic or other hard material covered by a rubber or foam material. In one embodiment, the raised portions 1106 are coated with a rubber material to provide an additional frictional fit when disposed against the corner of the electronic device. Further, it should be appreciated that other means for locking the position of the adjustable corner portions 1104 may be used. For example, a lever-operated side portion that extends and retracts from within the track or slot 1108 to push against the edge or side of the corresponding adjustable corner portion 1104 may be used. Further, separate clamps may be attached to the body that clamp each corresponding adjustable corner portion 1104 in place may be used. It should also be appreciated that in this embodiment, the raised portions 1106 are curved, which may, depending upon the corners of the electronic device to be held, provide a more tight, secure, or conformed fit against the corners of the electronic device.

Figure 12:
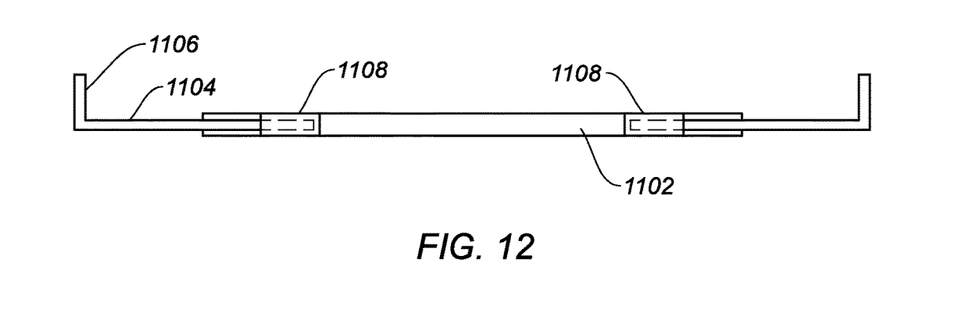
FIG. 12 is a front side view of the apparatus of FIG. 10.

FIG. 12 is a front side view of the apparatus of FIG. 11. This view illustrates the adjustable corner portions 1104 as each slides or fits into a corresponding track or slot 1108, which is contained within the depth or height of the body 1102.

Figure 13:
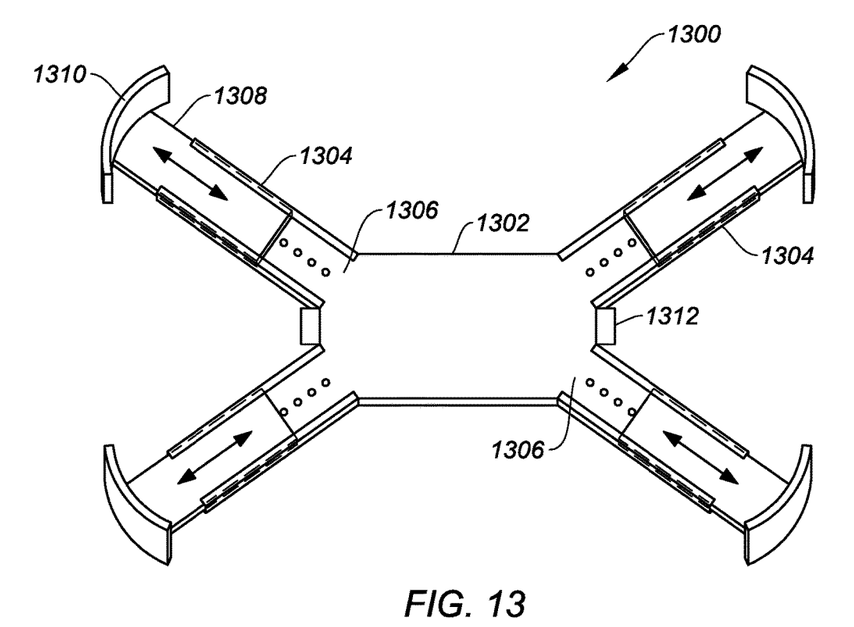
FIG. 13 is a top view of another apparatus for holding an electronic device according to one embodiment of the present invention.

FIG. 13 is a top view of another apparatus for holding an electronic device according to one embodiment of the present invention. The apparatus 1300 shown in FIG. 13 is similar to those shown in FIGS. 9-12, with the exception that the body 1302 is shaped differently. In this embodiment, the body includes four corner extension portions 1304 that extend from each corner 1306 of the main body 1302. Four adjustable corner portions 1308, each having a raised portion 1310, are attached to a corresponding corner extension portion 1304 such that each slides reversibly back and forth from the main body 1302. It should be appreciated that the manner in which the adjustable corner portions 1308 are attached to the corner extension portions 1304 may include any of the ways described above, including those described in connection with FIGS. 9-12. Accordingly, each adjustable corner portion 1308 can be extended independently and its length adjusted to accommodate any sized electronic device with any aspect ratio, noting that in this embodiment, the electronic device is being held in place at its corners.

Housings 1312 for straps, including adjustable straps are attached to or part of the main body 1302. Alternatively, housings for the straps can be disposed on each of the four corner extension portions 1304, which provides the ability to include two straps similar to that shown in connection with FIG. 8.

Figure 14:
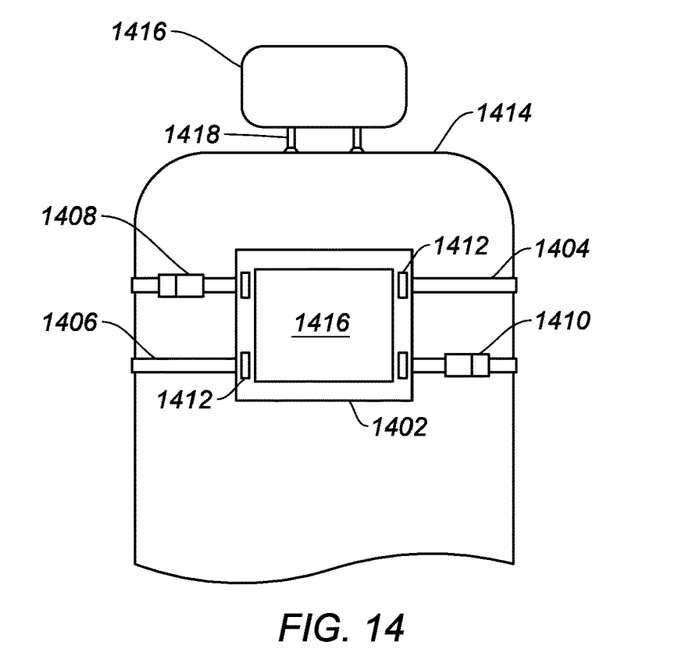
FIG. 14 illustrates an apparatus for holding an electronic device as attached to a car seat accordingly to one embodiment of the invention.
Figure 15:
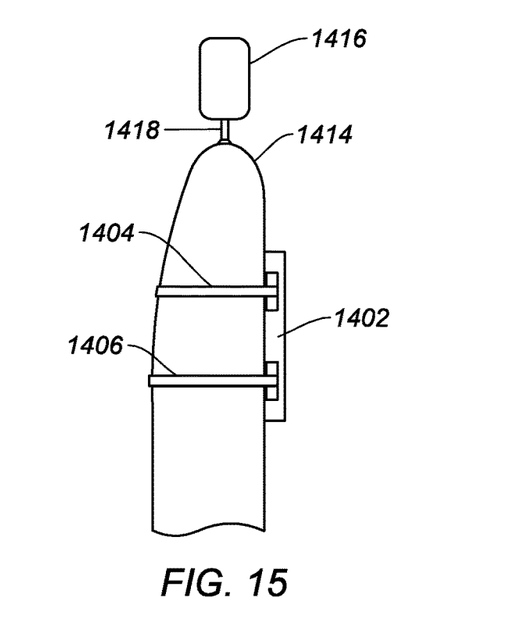
FIG. 15 illustrates a side view of the apparatus attached as attached to the car seat of FIG. 14.

FIG. 14 illustrates an apparatus for holding an electronic device as attached to a car seat accordingly to one embodiment of the invention. FIG. 15 illustrates a side view of the apparatus attached as attached to the car seat of FIG. 14. As shown, the apparatus 1402, which may be any of the embodiments described above, includes two retractable straps 1404, 1406, each of which can be connected and separated using the attached connectors 1408, 1410. Further, buttons 1412 may be used to control the retraction of the straps 1404, 1406. In other words, pushing the buttons 1412 permits each corresponding side of the straps 1404, 1406 to be retracted. The straps 1404, 1406 may otherwise simply be pulled to extend their length. Accordingly, as shown, the straps have been extended to fit around the back of a car seat 1414 and have been retracted to provide a tight fit such that an electronic device 1416 being held by the apparatus 1402 is held firmly against the back of the car seat 1414. In this manner, a user or passenger in the car that is seated behind this car seat 1414 can easily access and view the electronic device or its display. It should be appreciated that the straps 1404, 1406 can be positioned anywhere about the car seat 1414. For example, in one embodiment, the upper strap 1404 may be positioned around the headrest 1416 or its support arms 1418, and the lower strap 1406 may be positioned around the base of the seat 1414 where the back of the seat attaches to the base of the seat 1414 (not shown). The location or positioning of the straps 1404, 1406 may be selected to accommodate the comfort of a person sitting in the seat to which the straps are attached.

Figure 16:
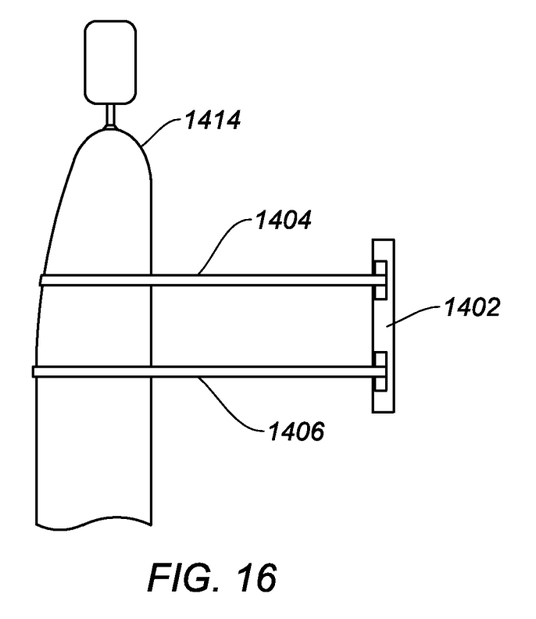
FIG. 16 illustrates a side view of the apparatus as attached to the car seat of FIG. 14 in an extended position.

FIG. 16 illustrates a side view of the apparatus as attached to the car seat of FIG. 14 in an extended position. As described above, the straps 1404, 1406 are retractable straps that can be automatically retracted by pushing the buttons 1412 (shown in FIG. 14). Therefore, the user, which would be a person sitting behind the car seat 1414, may elect to release the straps 1404, 1406 thereby allowing the apparatus and the electronic device to be pulled away from the car seat 1414 for use. In this case, the user may push the buttons 1412 necessary to release the straps 1404, 1406 to allow the user to pull the entire apparatus and the electronic device being held therein toward or closer to the user. For example, if the electronic device is a device for showing movies, when the apparatus is positioned against the car seat 1414 as shown in FIGS. 14 and 15, the user may be simply sitting behind the car seat 1414 watching the display screen of the electronic device as it plays the movie. The user may later decide to use the electronic device in another manner, such as an electronic book reader, an electronic gaming device for interactive game play, or a computer device for using software applications, and may desire to hold the electronic device closer. In this case, the user may elect to unlock the retractable straps by pushing the buttons 1412 necessary to release the straps 1404, 1406, thereby allowing the user to pull the entire apparatus 1402 with the electronic device closer. The user may then elect to return the apparatus and the electronic device to a position where it is position against the car seat 1414 by again pushing a button to release the lock on the retractable straps 1404, 1406 and allowing them to retract and shorten in length. Once the apparatus is returned to a position adjacent to the car seat 1414, the retractable straps would be locked in place again.

Figure 17:
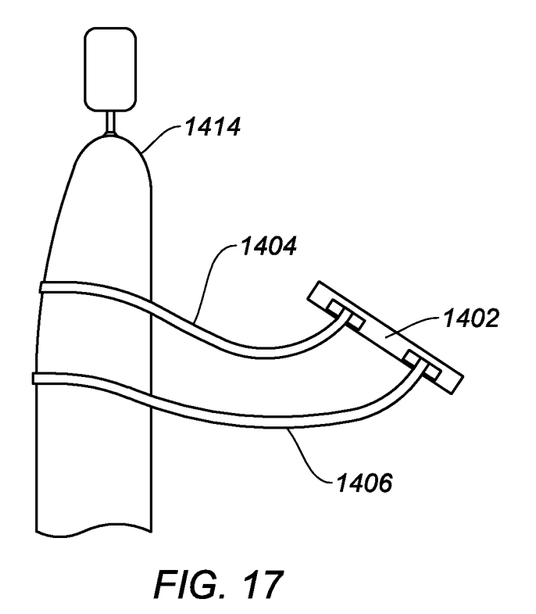
FIG. 17 illustrates a side view of the apparatus as attached to the car seat of FIG. 14 in another extended position.

FIG. 17 illustrates a side view of the apparatus as attached to the car seat of FIG. 14 in another extended position. FIG. 17 simply demonstrates that while the apparatus 1402 is pulled away from the car seat 1414, it can be held by the user in any orientation provided enough length of retractable straps 1404, 1406 has been extended from the housing holding the retractable straps 1404, 1406.

Various embodiments of the invention have been described above. However, it should be appreciated that alternative embodiments are possible and that the invention is not limited to the specific embodiments described above. For example, as described above, the apparatus for holding the electronic device may be any shape and may be made from any material. Further, the straps may also be made from any material suitable to conform to a structure and to hold the apparatus securely against that structure. It should also be appreciated that the structure to which the apparatus may be attached using the straps may be any structure. Further, it should be appreciated that in some embodiments, the invention may only include the ability to adjust to properly hold the desired device. In other embodiments, the invention may including the ability to adjust to properly hold the desired device in combination with the ability to be held in place against another structure, such as a car or airplane seat, with the ability to be pulled away from the structure for use and then returned to its original position against the structure, through the use of, for example, retractable straps.

What is claimed is:

1. An apparatus for holding a hand-held electronic device, comprising:
    a body having four sides each having a length and defining an opening for receipt of a hand-held electronic device, said opening having a cross-sectional area and wherein said length of each of said four sides is adjustable to change the cross-sectional area of said opening; and
    at least one strap attached to said body for attaching said body to a structure, and while attached to the structure, allowing said body to be pulled to and from the structure and allowing the hand-held electronic device to be used when said body is pulled from the structure;
    wherein each of said four sides comprises a small side piece and a large side piece, wherein said small side piece is configured to slide into and out of said large side piece, thereby enabling said length of each of said four sides to be adjustable.

2. The apparatus of claim 1, wherein said large side piece comprises a plurality of protrusions spaced at a set interval, wherein said small side piece comprises a plurality of depressions spaced at said set interval, and wherein said plurality of protrusions and said plurality of depressions are positioned to removably engage each other.

3. An apparatus for holding a hand-held electronic device, comprising:
    a body having four sides each having a length and defining an opening for receipt of a hand-held electronic device, said opening having a cross-sectional area and wherein said length of each of said four sides is adjustable to change the cross-sectional area of said opening;

at least one strap attached to said body for attaching said body to a structure, and while attached to the structure, allowing said body to be pulled to and from the structure and allowing the hand-held electronic device to be used when said body is pulled from the structure;

a cover attached to said body and configured to open and close; and a back panel attached to said body.

4. An apparatus for holding a hand-held electronic device, comprising:

a case having four sides each having a length and defining an opening for receipt of a hand-held electronic device, said opening having a cross-sectional area and wherein said length of each of said four sides is adjustable to increase or decrease the cross-sectional area of said opening;

at least one strap attached to said case for attaching said case to a structure and for allowing said case to be pulled to and from the structure; and at least one retraction means disposed within said case for pulling said at least one strap from said case and for retracting said at least one strap to a position within said case;

wherein each of said four sides comprises a first elongated piece and a second elongated piece defining an elongated opening along a length of said large elongated piece, wherein said first elongated piece is configured to slide into and out of said elongated opening.

5. The apparatus of claim 4, wherein said second elongated piece comprises a plurality of protrusions spaced at a set interval along said length, and wherein said second elongated piece comprises a plurality of depressions spaced at said set interval along a length of said second elongated piece that correspond to said plurality of protrusions.

6. An apparatus for holding a hand-held electronic device, comprising:

a case having four sides each having a length and defining an opening for receipt of a hand-held electronic device, said opening having a cross-sectional area and wherein said length of each of said four sides is adjustable to increase or decrease the cross-sectional area of said opening;

at least one strap attached to said case for attaching said case to a structure and for allowing said case to be pulled to and from the structure;

at least one retraction means disposed within said case for pulling said at least one strap from said case and for retracting said at least one strap to a position within said case;

a cover attached to said case and configured to open and close; and a back panel attached to said case.

7. An apparatus for holding a portable, hand-held electronic device, comprising:

a body;

four corner portions moveably attached to said body and defining an opening having a cross-sectional area for hand-held electronic device;

four receptacles, each configured to guide movement of a corresponding one of said corner portions in a straight line, wherein each of said four corner portions is configured to independently move, as guided by a corresponding one of said receptacles, toward and away from said body to increase or decrease the cross-sectional area of said opening;

at least one strap attached to said body for attaching said body to a structure and for allowing said body to be pulled to and from the structure; and a cover attached to said body to protect a face of the portable, hand-held electronic device and configured to open and close.

* * * * *